United States Patent [19]
Hiratsuka et al.

[11] Patent Number: 4,758,897
[45] Date of Patent: Jul. 19, 1988

[54] METHOD AND APPARATUS FOR ESTIMATING HALFTONE IMAGE FROM BINARY IMAGE

[75] Inventors: Seiichiro Hiratsuka, Tokyo; Masahiko Matsunawa, Hino, both of Japan

[73] Assignee: Konishiroku Photo Industry Co., Ltd., Tokyo, Japan

[21] Appl. No.: 856,954

[22] Filed: Apr. 28, 1986

[30] Foreign Application Priority Data

Apr. 30, 1985 [JP] Japan .................................. 60-92589
Jun. 14, 1985 [JP] Japan ................................. 60-130431
Jun. 14, 1985 [JP] Japan ................................. 60-130432

[51] Int. Cl.⁴ .............................................. H04N 1/40
[52] U.S. Cl. .................................... 358/283; 358/293; 358/287
[58] Field of Search ............... 358/280, 282, 283, 293; 382/9, 54, 52, 53

[56] References Cited

U.S. PATENT DOCUMENTS 4,194,221 3/1980 Stoffel ................................. 358/283
4,630,125 12/1986 Roetling ............................. 358/283
4,633,327 12/1986 Roetling ............................. 358/283

Primary Examiner—Edward L. Coles, Sr.
Attorney, Agent, or Firm—Jordan B. Bierman

[57] ABSTRACT

According to a method and apparatus for estimating a halftone image, a unit area is set and shifted by a focusing lens and a photoelectric transducer in a binary image consisting of black and white regions, and the halftone image is estimated on the basis of a ratio of the white regions to the black regions within each unit area. The number of white pixels is counted by an A/D converter. When different unit areas are used, a specific one satisfying predetermined conditions is selected and shifted in the binary image, and prestored image data is read out from RAMs by column and row address generators and calculated to obtain a halftone estimated value within each unit area. The binary image can be thus a Bayer dither image or a digital binary image.

9 Claims, 20 Drawing Sheets

FIG.1(a)
FIG.1(b)
FIG.1(c)
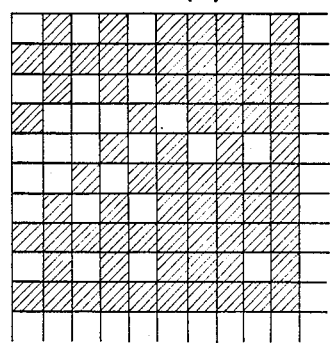
ORIGINAL HALFTONE IMAGE    THRESHOLD MATRIX    DITHER IMAGE
FIG.1(d)
FIG.1(e)
FIG.1(f)
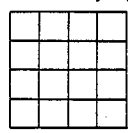 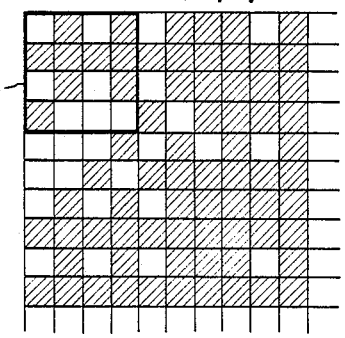
UNIT AREA    ESTIMATED HALFTONE IMAGE
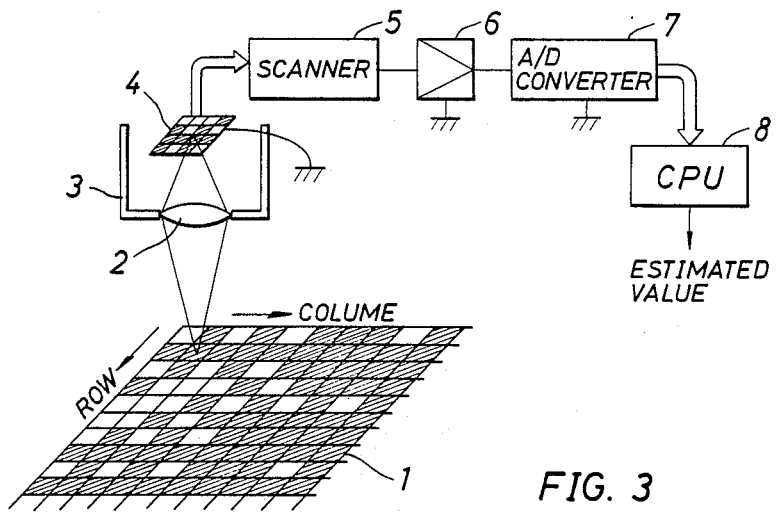
FIG. 3

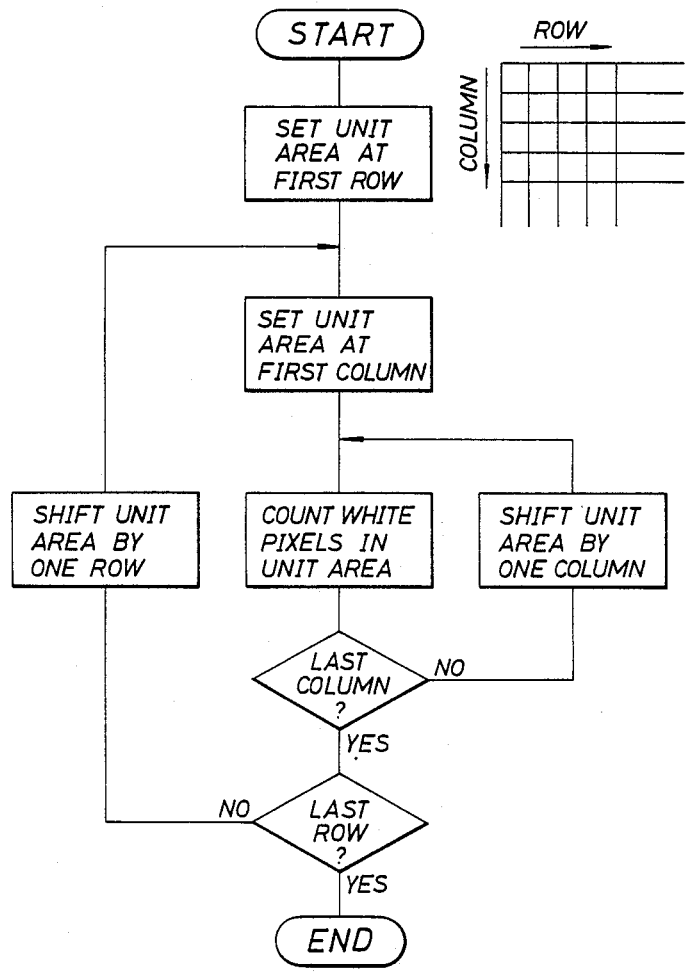

FIG. 5

| RAM NO. | ROW ADDRESS |
|---|---|
| RAM 0 | 0 |
| RAM 1 | 0 |
| RAM 2 | 0 |
| RAM 3 | 0 |
| RAM 0 | 1 |
| RAM 1 | 1 |
| RAM 2 | 1 |
| RAM 3 | 1 |
| RAM 0 | 2 |
| ⋮ | |

(Grid with ROW 0, ROW 1, ROW 2, ROW 3... and COLUMN 0, COLUMN 1...)

FIG. 6

| RAM \ ROW CLOCK | 0 | 1 | 2 | 3 | 4 | 5 | 6 |
|---|---|---|---|---|---|---|---|
| RAM 0 | 0 | 1 | 1 | 1 | 1 | 2 | 2 |
| RAM 1 | 0 | 0 | 1 | 1 | 1 | 1 | 2 |
| RAM 2 | 0 | 0 | 0 | 1 | 1 | 1 | 1 |
| RAM 3 | 0 | 0 | 0 | 0 | 1 | 1 | 1 |

FIG. 7

| J=0 | 1 | 2 | 3 | 4 |
|---|---|---|---|---|
| $d_{10}$ | $d_{11}$ | $d_{12}$ | $d_{13}$ | $d_{14}$ |
| $d_{20}$ | $d_{21}$ | $d_{22}$ | $d_{23}$ | $d_{24}$ |
| $d_{30}$ | $d_{31}$ | $d_{32}$ | $d_{33}$ | $d_{34}$ |
| $d_{40}$ | $d_{41}$ | $d_{42}$ | $d_{43}$ | $d_{44}$ |
| $\Sigma d_{i0}$ | $\Sigma d_{i1}$ | $\Sigma d_{i2}$ | $\Sigma d_{i3}$ | $\Sigma d_{i4}$ |
| $P_0$ | $P_1$ | $P_2$ | $P_3$ | $P_4$ |

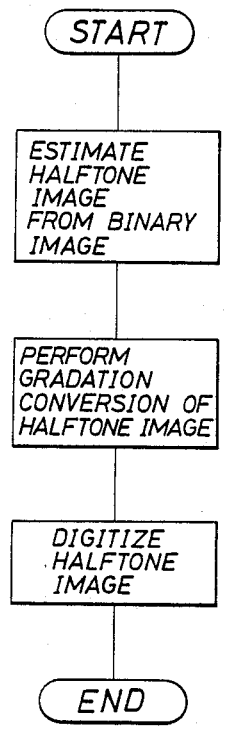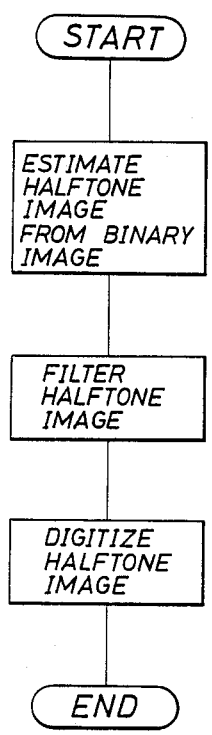

FIG. 9
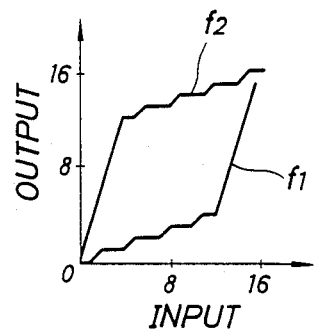
FIG.10(a)
| 2 | 2 | 2 | 1 | 1 | 1 | 0 |
|---|---|---|---|---|---|---|
| 3 | 3 | 2 | 1 | 1 | 1 | 1 |
| 4 | 3 | 3 | 2 | 1 | 1 | 1 |
| 4 | 3 | 3 | 2 | 1 | 1 | 1 |
| 3 | 2 | 1 | 1 | 1 | 1 | 1 |
| 2 | 2 | 1 | 1 | 1 | 0 | 0 |
| 1 | 1 | 1 | 1 | 1 | 0 | 0 |
FIG.10(b)
| 13 | 13 | 13 | 12 | 9  | 6 | 3 |
|----|----|----|----|----|---|---|
| 13 | 13 | 13 | 12 | 12 | 9 | 6 |
| 14 | 14 | 13 | 13 | 12 | 9 | 6 |
| 14 | 14 | 13 | 13 | 12 | 9 | 6 |
| 13 | 13 | 12 | 12 | 9  | 6 | 6 |
| 13 | 13 | 12 | 9  | 6  | 3 | 3 |
| 12 | 12 | 12 | 6  | 6  | 3 | 3 |
FIG.10(c)
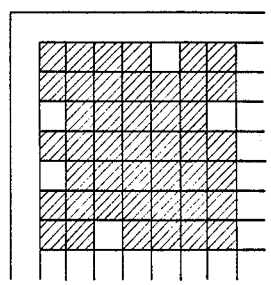
FIG.10(d)
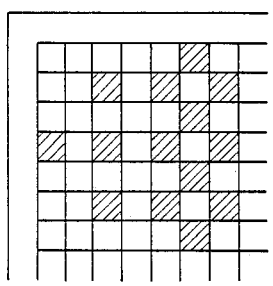

FIG. 13(a)
| 8 | 7 | 4 | 5 | 4 |
|---|---|---|---|---|
| 13 | 9 | 7 | 3 | 3 |
| 14 | 11 | 8 | 4 | 4 |
| 6 | 1 | 3 | 3 | 1 |
| 7 | 7 | 2 | 1 | 0 |
HIGH-PASS
HALFTONE IMAGE
FIG. 13(b)
| 8 | 7 | 4 | 5 | 4 |
|---|---|---|---|---|
| 9 | 8 | 6 | 4 | 3 |
| 9 | 7 | 5 | 4 | 3 |
| 7 | 6 | 4 | 3 | 2 |
| 6 | 4 | 3 | 2 | 2 |
LOW-PASS
HALFTONE IMAGE
FIG. 13(c)
| 0 | 8 | 2 | 10 |
|---|---|---|---|
| 12 | 4 | 14 | 6 |
| 3 | 11 | 1 | 9 |
| 15 | 7 | 13 | 5 |
DITHER MATRIX
FIG. 13(d)
| 0 | 8 | 2 | 10 |
|---|---|---|---|
| 12 | 4 | 14 | 6 |
| 3 | 11 | 1 | 9 |
| 15 | 7 | 13 | 5 |
DITHER MATRIX
FIG. 13(e)
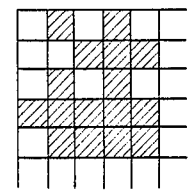
HIGH-PASS
DITHER IMAGE
FIG. 13(f)
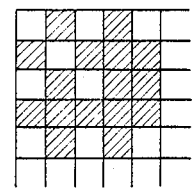
LOW-PASS
DITHER IMAGE
FIG. 14
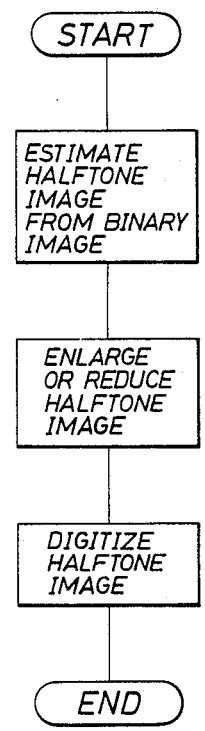

FIG. 15(a)
|7|7|7|7|4|3|2|1|1|
|8|8|7|7|5|4|3|2|2|
|11|10|8|8|6|4|3|2|2|
|11|10|8|8|6|4|3|2|2|
|11|10|8|8|6|4|3|2|2|
|8|7|5|5|4|3|2|2|2|
|7|6|5|5|3|2|1|1|1|
|4|4|4|4|2|2|1|1|1|
|4|4|4|4|2|2|1|1|1|
ENLARGED HALFTONE IMAGE
FIG. 15(b)
|7|7|4|3|2|
|8|8|5|4|3|
|11|10|6|4|3|
|8|7|4|3|2|
|7|6|3|2|1|
REDUCED HALFTONE IMAGE
FIG. 15(c)
|0|8|2|10|
|12|4|14|6|
|3|11|1|9|
|15|7|13|5|
DITHER MATRIX
FIG. 15(d)
|0|8|2|10|
|12|4|14|6|
|3|11|1|9|
|15|7|13|5|
DITHER MATRIX
FIG. 15(e)
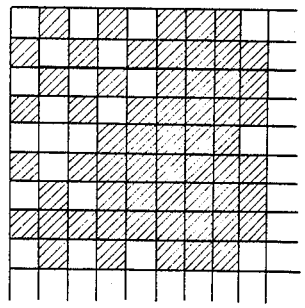
ENLARGED DITHER IMAGE
FIG. 15(f)
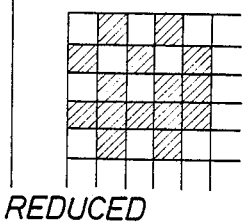
REDUCED DITHER IMAGE
FIG.16(A)   FIG.16(B)   FIG.16(C)   FIG.16(D)
   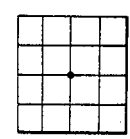

FIG.17(a)
| 4  | 4  | 4 | 4 | 0 | 0 | 0 |
|----|----|---|---|---|---|---|
| 12 | 12 | 8 | 8 | 4 | 0 | 0 |
| 16 | 12 | 8 | 8 | 8 | 4 | 4 |
| 12 | 8  | 8 | 4 | 4 | 4 | 4 |
| 8  | 8  | 8 | 4 | 0 | 0 | 0 |
| 4  | 4  | 4 | 4 | 0 | 0 | 0 |
| 4  | 4  | 4 | 4 | 0 | 0 | 4 |
FIG.17(b)
| 4  | 4  | 4  | 2 | 2 | 0 | 0 |
|----|----|----|---|---|---|---|
| 10 | 10 | 10 | 6 | 4 | 2 | 0 |
| 12 | 12 | 10 | 8 | 6 | 6 | 4 |
| 12 | 10 | 6  | 6 | 4 | 4 | 4 |
| 10 | 8  | 6  | 4 | 2 | 0 | 0 |
| 4  | 4  | 4  | 2 | 2 | 0 | 0 |
| 4  | 4  | 4  | 2 | 2 | 2 | 2 |
FIG.17(c)
| 8  | 8  | 6 | 6 | 2 | 0 | 2 |
|----|----|---|---|---|---|---|
| 10 | 8  | 6 | 6 | 4 | 2 | 2 |
| 12 | 10 | 8 | 6 | 4 | 2 | 2 |
| 12 | 10 | 8 | 6 | 4 | 2 | 2 |
| 8  | 6  | 6 | 4 | 2 | 2 | 2 |
| 6  | 6  | 6 | 4 | 0 | 0 | 2 |
| 4  | 4  | 4 | 4 | 0 | 0 | 2 |
FIG.17(d)
| 7  | 7  | 7 | 4 | 3 | 2 | 1 |
|----|----|---|---|---|---|---|
| 8  | 8  | 7 | 5 | 4 | 3 | 2 |
| 11 | 10 | 8 | 6 | 4 | 3 | 2 |
| 11 | 10 | 8 | 6 | 4 | 3 | 2 |
| 8  | 7  | 5 | 4 | 3 | 2 | 2 |
| 7  | 6  | 5 | 3 | 2 | 1 | 1 |
| 4  | 4  | 4 | 2 | 2 | 1 | 1 |
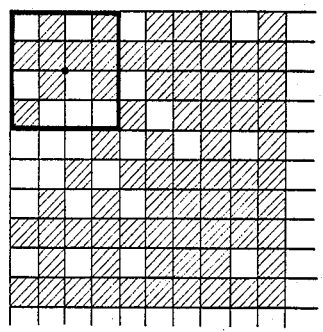
FIG. 18
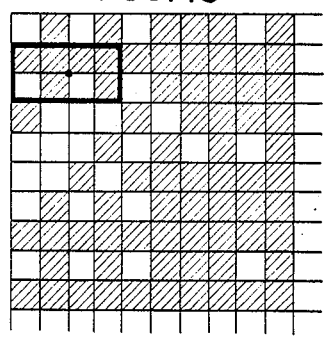
FIG. 19
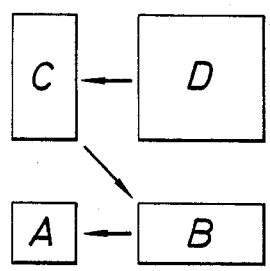
FIG. 20

FIG. 21(a)   FIG. 21(b)   FIG. 21(c)   FIG. 21(d)
D 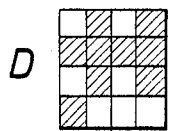 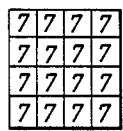 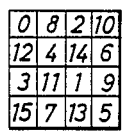 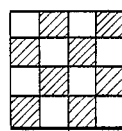
NON COINCIDENCE
C  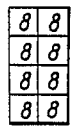  
NON COINCIDENCE
B 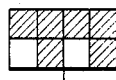  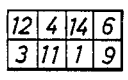 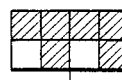
COINCIDENCE
SELECTED UNIT AREA B
ESTIMATED VALUE 4

ESTIMATED
HALFTONE IMAGE

FIG. 24
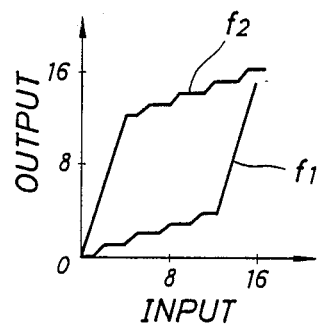
FIG. 25(a)
| 1 | 1 | 1 | 1 | 0 | 0 | 0 |
|---|---|---|---|---|---|---|
| 4 | 4 | 3 | 3 | 1 | 0 | 0 |
| 16| 4 | 3 | 3 | 3 | 1 | 1 |
| 4 | 3 | 3 | 1 | 1 | 1 | 1 |
| 3 | 3 | 3 | 1 | 0 | 0 | 0 |
| 1 | 1 | 1 | 1 | 0 | 0 | 0 |
| 1 | 1 | 1 | 1 | 0 | 0 | 1 |
FIG. 25(b)
| 12 | 12 | 12 | 12 | 0  | 0  | 0  |
|----|----|----|----|----|----|----|
| 15 | 15 | 13 | 13 | 12 | 0  | 0  |
| 16 | 15 | 13 | 13 | 13 | 12 | 12 |
| 15 | 13 | 13 | 12 | 12 | 12 | 6  |
| 13 | 13 | 13 | 12 | 0  | 0  | 0  |
| 12 | 12 | 12 | 12 | 0  | 0  | 0  |
| 12 | 12 | 12 | 12 | 0  | 0  | 6  |
FIG. 25(c)
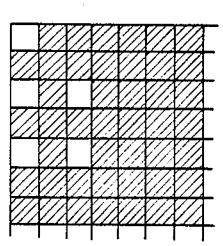
FIG. 25(d)
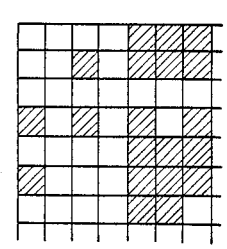

| 24 | 8 | 16 | 4 | -8 |
| 16 | 4 | 12 | 20 | 4 |
| 0 | 12 | -4 | 4 | 10 |
| 12 | 16 | 4 | -8 | -4 |
| 0 | 0 | 8 | -4 | 0 |

HIGH-PASS HALFTONE IMAGE

| 9 | 8 | 6 | 4 | 2 |
| 11 | 8 | 7 | 5 | 3 |
| 10 | 8 | 6 | 4 | 3 |
| 7 | 6 | 4 | 2 | 1 |
| 5 | 5 | 3 | 1 | 0 |

LOW-PASS HALFTONE IMAGE

| 0 | 8 | 2 | 10 |
| 12 | 4 | 14 | 6 |
| 3 | 11 | 1 | 9 |
| 15 | 7 | 13 | 5 |

DITHER MATRIX

| 0 | 8 | 2 | 10 |
| 12 | 4 | 14 | 6 |
| 3 | 11 | 1 | 9 |
| 15 | 7 | 13 | 5 |

DITHER MATRIX

| 1 | 0 | 1 | 0 | 0 |
| 1 | 0 | 0 | 1 | 0 |
| 0 | 1 | 0 | 0 | 1 |
| 0 | 1 | 0 | 0 | 0 |
| 0 | 0 | 1 | 0 | 0 |

HIGH-PASS DITHER IMAGE

| 1 | 0 | 1 | 0 | 1 |
| 0 | 1 | 0 | 0 | 0 |
| 1 | 0 | 1 | 0 | 0 |
| 0 | 0 | 0 | 0 | 0 |
| 1 | 0 | 1 | 0 | 0 |

LOW-PASS DITHER IMAGE

FIG.29(a)

| 4 | 4 | 4 | 4 | 4 | 0 | 0 | 0 | 0 |
|---|---|---|---|---|---|---|---|---|
| 12 | 12 | 8 | 8 | 8 | 4 | 0 | 0 | 0 |
| 16 | 12 | 8 | 8 | 8 | 8 | 4 | 4 | 4 |
| 16 | 12 | 8 | 8 | 8 | 8 | 4 | 4 | 4 |
| 12 | 8 | 8 | 8 | 4 | 4 | 4 | 2 | 2 |
| 8 | 8 | 8 | 8 | 4 | 0 | 0 | 0 | 0 |
| 4 | 4 | 4 | 4 | 4 | 0 | 0 | 0 | 0 |
| 4 | 4 | 4 | 4 | 4 | 0 | 0 | 2 | 2 |
| 4 | 4 | 4 | 4 | 4 | 0 | 0 | 2 | 2 |

ENLARGED HALFTONE IMAGE

FIG.29(b)

| 4 | 4 | 4 | 0 | 0 |
|---|---|---|---|---|
| 12 | 12 | 8 | 4 | 0 |
| 12 | 8 | 4 | 4 | 4 |
| 8 | 8 | 4 | 0 | 0 |
| 4 | 4 | 4 | 0 | 0 |

REDUCED HALFTONE IMAGE

FIG.29(c)

| 0 | 8 | 2 | 10 |
|---|---|---|----|
| 12 | 4 | 14 | 6 |
| 3 | 11 | 1 | 9 |
| 15 | 7 | 13 | 5 |

DITHER MATRIX

FIG.29(d)

| 0 | 8 | 2 | 10 |
|---|---|---|----|
| 12 | 4 | 14 | 6 |
| 3 | 11 | 1 | 9 |
| 15 | 7 | 13 | 5 |

DITHER MATRIX

FIG.29(e)

| 1 | 0 | 1 | 0 | 1 | 0 | 0 | 0 | 0 |
|---|---|---|---|---|---|---|---|---|
| 0 | 1 | 0 | 1 | 0 | 0 | 0 | 0 | 0 |
| 1 | 1 | 1 | 0 | 1 | 0 | 1 | 0 | 1 |
| 1 | 1 | 0 | 1 | 0 | 1 | 0 | 0 | 0 |
| 1 | 0 | 1 | 0 | 1 | 0 | 1 | 0 | 1 |
| 0 | 1 | 0 | 1 | 0 | 0 | 0 | 0 | 0 |
| 1 | 0 | 1 | 0 | 1 | 0 | 0 | 0 | 0 |
| 0 | 0 | 0 | 0 | 0 | 0 | 0 | 0 | 0 |
| 1 | 0 | 1 | 0 | 1 | 0 | 0 | 0 | 1 |

ENLARGED DITHER IMAGE

FIG.29(f)

| 1 | 0 | 1 | 0 | 1 |
|---|---|---|---|---|
| 0 | 1 | 0 | 1 | 0 |
| 1 | 1 | 1 | 0 | 1 |
| 1 | 1 | 0 | 1 | 0 |
| 1 | 0 | 1 | 0 | 1 |

REDUCED DITHER IMAGE

FIG. 30
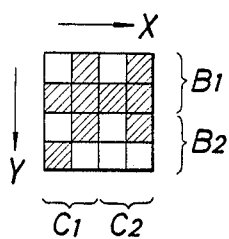
FIG. 31
| | INEQUALITY (2) | | |
|---|---|---|---|
| INEQUALITY (1) | | ○ | × |
| | ○ | D | C |
| | × | B | A |
FIG. 32
| 4 | 4 | 4 | 4 | 2 | 2 | 1 |
|---|---|---|---|---|---|---|
| 10 | 12 | 10 | 6 | 4 | 2 | 0 |
| 11 | 10 | 8 | 6 | 4 | 3 | 4 |
| 11 | 8 | 8 | 4 | 4 | 4 | 4 |
| 8 | 8 | 5 | 4 | 3 | 0 | 0 |
| 4 | 4 | 5 | 4 | 0 | 1 | 1 |
| 4 | 4 | 4 | 4 | 0 | 1 | 1 |
ESTIMATED HALFTONE IMAGE
FIG. 33(a)
| 1 | 1 | 1 | 1 | 1 | 1 | 0 |
|---|---|---|---|---|---|---|
| 3 | 4 | 3 | 2 | 1 | 1 | 0 |
| 4 | 3 | 3 | 2 | 1 | 1 | 1 |
| 4 | 3 | 3 | 1 | 1 | 1 | 1 |
| 3 | 3 | 2 | 1 | 1 | 0 | 0 |
| 1 | 1 | 2 | 1 | 0 | 0 | 0 |
| 1 | 1 | 1 | 1 | 0 | 0 | 0 |
FIG. 33(b)
| 12 | 12 | 12 | 12 | 6 | 6 | 3 |
|---|---|---|---|---|---|---|
| 14 | 15 | 14 | 13 | 12 | 6 | 0 |
| 14 | 14 | 13 | 13 | 12 | 9 | 12 |
| 14 | 13 | 13 | 12 | 12 | 12 | 12 |
| 13 | 13 | 12 | 12 | 9 | 0 | 0 |
| 12 | 12 | 12 | 12 | 0 | 3 | 3 |
| 12 | 12 | 12 | 12 | 0 | 3 | 3 |
FIG. 33(c)
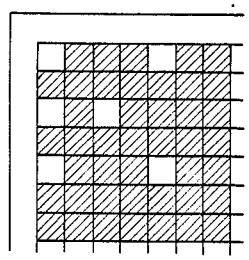
FIG. 33(d)
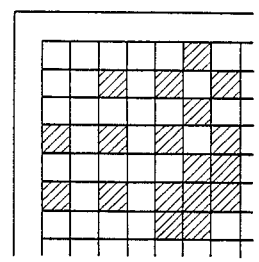

FIG. 34(a)

| 26 | 20 | 6 | 6 | 1 |
|----|----|----|----|----|
| 11 | 6 | 8 | 3 | 1 |
| 3 | 15 | -2 | 5 | 9 |
| 15 | 0 | 4 | 7 | -8 |
| -1 | 8 | 7 | -8 | 3 |

HIGH-PASS HALFTONE IMAGE

FIG. 34(b)

| 8 | 7 | 5 | 4 | 2 |
|----|----|----|----|----|
| 10 | 8 | 6 | 4 | 3 |
| 9 | 7 | 5 | 4 | 3 |
| 7 | 6 | 4 | 3 | 2 |
| 5 | 5 | 3 | 2 | 1 |

LOW-PASS HALFTONE IMAGE

FIG. 34(c)

| 0 | 8 | 2 | 10 |
|----|----|----|----|
| 12 | 4 | 14 | 6 |
| 3 | 11 | 1 | 9 |
| 15 | 7 | 13 | 5 |

DITHER MATRIX

FIG. 34(d)

| 0 | 8 | 2 | 10 |
|----|----|----|----|
| 12 | 4 | 14 | 6 |
| 3 | 11 | 1 | 9 |
| 15 | 7 | 13 | 5 |

DITHER MATRIX

FIG. 34(e)

| 1 | 1 | 1 | 0 | 1 |
|----|----|----|----|----|
| 0 | 1 | 0 | 0 | 0 |
| 0 | 1 | 0 | 0 | 1 |
| 0 | 0 | 0 | 1 | 0 |
| 0 | 0 | 1 | 0 | 1 |

HIGH-PASS DITHER IMAGE

FIG. 34(f)

| 1 | 0 | 1 | 0 | 1 |
|----|----|----|----|----|
| 0 | 1 | 0 | 0 | 0 |
| 1 | 0 | 1 | 0 | 0 |
| 0 | 0 | 0 | 0 | 0 |
| 1 | 0 | 1 | 0 | 1 |

LOW-PASS DITHER IMAGE

FIG. 35(a)

| 4 | 4 | 4 | 4 | 2 | 2 | 1 | 1 |
|---|---|---|---|---|---|---|---|
| 10 | 12 | 10 | 10 | 6 | 4 | 2 | 0 | 0 |
| 11 | 10 | 8 | 8 | 6 | 4 | 3 | 4 | 4 |
| 11 | 10 | 8 | 8 | 6 | 4 | 3 | 4 | 4 |
| 11 | 8 | 8 | 8 | 4 | 4 | 4 | 4 | 4 |
| 8 | 8 | 5 | 5 | 4 | 3 | 0 | 0 | 0 |
| 4 | 4 | 5 | 5 | 4 | 0 | 1 | 1 | 1 |
| 4 | 4 | 4 | 4 | 4 | 0 | 1 | 1 | 1 |
| 4 | 4 | 4 | 4 | 4 | 0 | 1 | 1 | 1 |

ENLARGED HALFTONE IMAGE

FIG. 35(b)

| 4 | 4 | 4 | 2 | 2 |
|---|---|---|---|---|
| 10 | 12 | 6 | 4 | 2 |
| 11 | 8 | 4 | 4 | 4 |
| 8 | 8 | 4 | 3 | 0 |
| 4 | 4 | 4 | 0 | 1 |

REDUCED HALFTONE IMAGE

FIG. 35(c)

| 0 | 8 | 2 | 10 |
|---|---|---|---|
| 12 | 4 | 14 | 6 |
| 3 | 11 | 1 | 9 |
| 15 | 7 | 13 | 5 |

DITHER MATRIX

FIG. 35(d)

| 0 | 8 | 2 | 10 |
|---|---|---|---|
| 12 | 4 | 14 | 6 |
| 3 | 11 | 1 | 9 |
| 15 | 7 | 13 | 5 |

DITHER MATRIX

FIG. 35(e)

| 1 | 0 | 1 | 0 | 1 | 0 | 0 | 1 |
|---|---|---|---|---|---|---|---|
| 0 | 1 | 0 | 1 | 0 | 0 | 0 | 0 |
| 1 | 0 | 1 | 0 | 1 | 0 | 1 | 0 |
| 0 | 1 | 0 | 1 | 0 | 0 | 0 | 0 |
| 1 | 0 | 1 | 0 | 1 | 0 | 1 | 0 |
| 0 | 1 | 0 | 0 | 0 | 0 | 0 | 0 |
| 1 | 0 | 1 | 0 | 1 | 0 | 0 | 0 |
| 0 | 0 | 0 | 0 | 0 | 0 | 0 | 0 |
| 1 | 0 | 1 | 0 | 1 | 0 | 0 | 1 |

ENLARGED DITHER IMAGE

FIG. 35(f)

| 1 | 0 | 1 | 0 | 1 |
|---|---|---|---|---|
| 0 | 1 | 0 | 1 | 0 |
| 1 | 0 | 1 | 0 | 1 |
| 0 | 1 | 0 | 1 | 0 |
| 1 | 0 | 1 | 0 | 1 |

REDUCED DITHER IMAGE

FIG. 36

| INEQUALITY | $\|2a-b\| \leq 1$ | X | X | O | O | O | O |
|---|---|---|---|---|---|---|---|
| | $\|2a-c\| \leq 1$ | X | O | X | O | O | O |
| | $\|2b-d\| \leq 1$ | ※ | ※ | ※ | X | O | O |
| | $\|2c-d\| \leq 1$ | ※ | ※ | ※ | ※ | X | O |
| | SELECTED UNITAREA | A | C | B | C | B | D |

FIG. 37

| 4 | 4 | 6 | 2 | 3 | 0 | 1 |
|---|---|---|---|---|---|---|
| 10 | 10 | 6 | 5 | 4 | 3 | 2 |
| 16 | 10 | 8 | 6 | 6 | 2 | 2 |
| 11 | 10 | 8 | 6 | 4 | 3 | 2 |
| 8 | 7 | 5 | 4 | 3 | 2 | 2 |
| 6 | 6 | 5 | 3 | 2 | 1 | 1 |
| 4 | 4 | 4 | 2 | 2 | 1 | 1 |

ESTIMATED HALFTONE IMAGE

FIG. 38(a)

| 1 | 1 | 2 | 1 | 1 | 0 | 0 |
|---|---|---|---|---|---|---|
| 3 | 3 | 2 | 2 | 1 | 1 | 1 |
| 16 | 3 | 3 | 2 | 2 | 1 | 1 |
| 4 | 3 | 3 | 2 | 1 | 1 | 1 |
| 3 | 2 | 2 | 1 | 1 | 1 | 1 |
| 2 | 2 | 2 | 1 | 1 | 0 | 0 |
| 1 | 1 | 1 | 1 | 1 | 0 | 0 |

FIG. 38(b)

| 12 | 12 | 13 | 6 | 9 | 0 | 3 |
|---|---|---|---|---|---|---|
| 14 | 14 | 13 | 12 | 12 | 9 | 6 |
| 16 | 14 | 13 | 13 | 13 | 6 | 6 |
| 14 | 14 | 13 | 13 | 12 | 9 | 6 |
| 13 | 13 | 12 | 12 | 9 | 6 | 6 |
| 13 | 13 | 12 | 9 | 6 | 3 | 3 |
| 12 | 12 | 12 | 6 | 6 | 3 | 3 |

FIG. 38(c)

| 0 | 1 | 1 | 1 | 0 | 1 | 1 |
|---|---|---|---|---|---|---|
| 1 | 1 | 1 | 1 | 1 | 1 | 1 |
| 0 | 1 | 0 | 1 | 1 | 1 | 1 |
| 1 | 1 | 1 | 1 | 1 | 1 | 1 |
| 0 | 1 | 1 | 1 | 0 | 1 | 1 |
| 1 | 1 | 1 | 1 | 1 | 1 | 1 |
| 1 | 1 | 1 | 1 | 1 | 1 | 1 |

FIG. 38(d)

| 0 | 0 | 0 | 1 | 0 | 1 | 0 |
|---|---|---|---|---|---|---|
| 0 | 0 | 1 | 0 | 1 | 0 | 1 |
| 0 | 0 | 0 | 0 | 0 | 1 | 0 |
| 1 | 0 | 1 | 0 | 1 | 0 | 1 |
| 0 | 0 | 0 | 0 | 0 | 1 | 0 |
| 0 | 0 | 1 | 0 | 1 | 1 | 1 |
| 0 | 0 | 0 | 1 | 0 | 1 | 0 |

FIG. 39(a)
| 20 | 1 | 7 | 3 | 7 |
|---|---|---|---|---|
| 6 | 10 | 5 | 14 | -4 |
| 14 | 11 | 8 | 2 | 5 |
| 6 | 1 | 3 | 3 | 1 |
| 8 | 7 | 2 | 1 | -1 |
HIGH-PASS
HALFTONE IMAGE
FIG. 39(b)
| 8 | 6 | 5 | 3 | 3 |
|---|---|---|---|---|
| 10 | 8 | 6 | 4 | 3 |
| 9 | 7 | 6 | 4 | 3 |
| 7 | 6 | 4 | 3 | 2 |
| 5 | 4 | 3 | 2 | 2 |
LOW-PASS
HALFTONE IMAGE
FIG. 39(c)
| 0 | 8 | 2 | 10 |
|---|---|---|---|
| 12 | 4 | 14 | 6 |
| 3 | 11 | 1 | 9 |
| 15 | 7 | 13 | 5 |
DITHER MATRIX
FIG. 39(d)
| 0 | 8 | 2 | 10 |
|---|---|---|---|
| 12 | 4 | 14 | 6 |
| 3 | 11 | 1 | 9 |
| 15 | 7 | 13 | 5 |
DITHER MATRIX
FIG. 39(e)
| 1 | 0 | 1 | 0 | 1 |
|---|---|---|---|---|
| 0 | 1 | 0 | 1 | 0 |
| 1 | 0 | 1 | 0 | 1 |
| 0 | 0 | 0 | 0 | 0 |
| 1 | 0 | 0 | 0 | 0 |
HIGH-PASS
DITHER IMAGE
FIG. 39(f)
| 1 | 0 | 1 | 0 | 1 |
|---|---|---|---|---|
| 0 | 1 | 0 | 0 | 0 |
| 1 | 0 | 1 | 0 | 0 |
| 0 | 0 | 0 | 0 | 0 |
| 1 | 0 | 1 | 0 | 1 |
LOW-PASS
DITHER IMAGE
FIG. 41(a) PRIOR ART
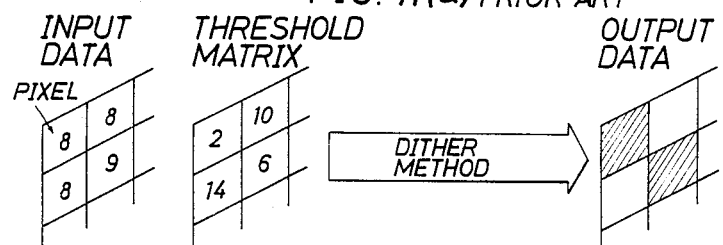
FIG. 41(b) PRIOR ART
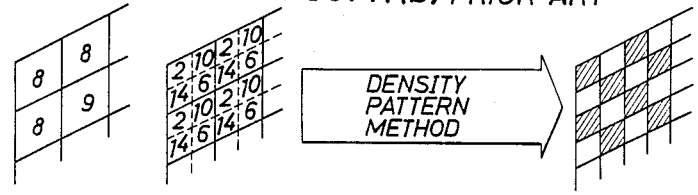

FIG. 40(a)

| 4 | 4 | 6 | 6 | 2 | 3 | 0 | 1 | 1 |
|---|---|---|---|---|---|---|---|---|
| 10| 10| 6 | 6 | 5 | 4 | 3 | 2 | 2 |
| 16| 10| 8 | 8 | 6 | 6 | 2 | 2 | 2 |
| 16| 10| 8 | 8 | 6 | 6 | 2 | 2 | 2 |
| 11| 10| 8 | 8 | 6 | 4 | 3 | 2 | 2 |
| 8 | 7 | 5 | 5 | 4 | 3 | 2 | 2 | 2 |
| 6 | 6 | 5 | 5 | 3 | 2 | 1 | 1 | 1 |
| 4 | 4 | 4 | 4 | 2 | 2 | 1 | 1 | 1 |
| 4 | 4 | 4 | 4 | 2 | 2 | 1 | 1 | 1 |

ENLARGED HALFTONE IMAGE

FIG. 40(b)

| 4 | 4 | 2 | 3 | 0 |
|---|---|---|---|---|
| 10| 10| 5 | 4 | 3 |
| 11| 10| 6 | 4 | 3 |
| 8 | 7 | 4 | 3 | 2 |
| 6 | 6 | 3 | 2 | 1 |

REDUCED HALFTONE IMAGE

FIG. 40(c)

| 0 | 8 | 2 | 10|
|---|---|---|---|
| 12| 4 | 14| 6 |
| 3 | 11| 1 | 9 |
| 15| 7 | 13| 5 |

DITHER MATRIX

FIG. 40(d)

| 0 | 8 | 2 | 10|
|---|---|---|---|
| 12| 4 | 14| 6 |
| 3 | 11| 1 | 9 |
| 15| 7 | 13| 5 |

DITHER MATRIX

FIG. 40(e)

| 1 | 0 | 1 | 0 | 1 | 0 | 0 | 0 | 1 |
|---|---|---|---|---|---|---|---|---|
| 0 | 1 | 0 | 0 | 0 | 0 | 0 | 0 | 0 |
| 1 | 0 | 1 | 0 | 1 | 0 | 1 | 0 | 0 |
| 1 | 1 | 0 | 1 | 0 | 0 | 0 | 0 | 0 |
| 1 | 1 | 1 | 0 | 1 | 0 | 1 | 0 | 1 |
| 0 | 1 | 0 | 0 | 0 | 0 | 0 | 0 | 0 |
| 1 | 0 | 1 | 0 | 0 | 0 | 0 | 0 | 0 |
| 0 | 0 | 0 | 0 | 0 | 0 | 0 | 0 | 0 |
| 1 | 0 | 1 | 0 | 1 | 0 | 0 | 0 | 1 |

ENLARGED DITHER IMAGE

FIG. 40(f)

| 1 | 0 | 1 | 0 | 1 |
|---|---|---|---|---|
| 0 | 1 | 0 | 0 | 0 |
| 1 | 0 | 1 | 0 | 1 |
| 1 | 1 | 0 | 1 | 0 |
| 1 | 1 | 1 | 0 | 1 |

REDUCED DITHER IMAGE

METHOD AND APPARATUS FOR ESTIMATING HALFTONE IMAGE FROM BINARY IMAGE

BACKGROUND OF THE INVENTION

1. Field of the Invention

The present invention relates to a method and apparatus for estimating a halftone image from a binary image and, more particularly, to a method and apparatus for effectively estimating an original halftone image from a binary image displayed as a pseudo halftone image.

2. Description of the Prior Art

Most existing output devices such as display devices and printers reproduce images using binary notation, i.e., black and white. A density or concentration pattern method (brightness pattern method) and a dither method are known as ways to represent a pseudo halftone image using such an output device. These methods are both types of an area gradation method, which changes the number of dots recorded within a predetermined area (matrix).

According to the density pattern method, a portion corresponding to one pixel of an original is recorded by a plurality of dots using a threshold matrix, as shown in FIG. 41(b). According to the dither method, a portion corresponding to one pixel of an original is recorded with a single dot, as shown in FIG. 41(a). Dither data outputs are obtained as shown in FIGS. 41(a) and 41(b), respectively. These data outputs represent pseudo halftone images using black and white dots.

If a binary pseudo halftone image can be reconverted to the original halftone image (corresponding to the input data in FIGS. 16(A) to 16(D)), various types of data processing can be performed to provide versatility in image conversion. In the case of the density pattern image, the original halftone image can be immediately obtained if pattern level distribution is known. However, density pattern images suffer from low resolution despite requiring a large amount of data. On the other hand, dither images have higher resolution but cannot be easily reconverted to original halftone images. Therefore, various types of image conversion cannot be performed using only dither images.

SUMMARY OF THE INVENTION

It is an object of the present invention to provide a method and apparatus for effectively estimating an original halftone image from a binary image (e.g., a dither image).

According to a first aspect of the present invention, a unit area is set in a binary image consisting of white and black regions and is shifted within the binary image. The halftone image is then estimated on the basis of the ratio of white regions to black regions within the unit area.

According to a second aspect of the present invention, in a dither image prepared using a dither matrix, different unit areas are set. A dither image in each unit area is compared with a binary image obtained by the dither matrix on the basis of a halftone image prepared by the number of black or white pixels within the corresponding unit area to select a specific unit area for each pixel of a halftone image to be estimated. The halftone image is then estimated on the basis of the number of black or white pixels within the selected unit area.

According to a third aspect of the present invention, different unit areas are set for a binary image consisting of black and white regions. A specific unit area which satisfies a predetermined condition is selected by shifting the unit areas in units of pixels. A halftone image is then estimated on the basis of the ratio of white regions to black regions within the selected unit area. More specifically, the different unit areas are placed on a digital binary image. The number of white or black pixels within each unit area is detected and calculated according to predetermined processing. A specific unit area is selected for each pixel of the halftone image to be estimated. The halftone image is thus estimated on the basis of the number of black or white pixels.

BRIEF DESCRIPTION OF THE DRAWINGS

FIGS. 1(a) to 1(f) are tables for explaining a method of estimating a halftone image according to a first embodiment of the present invention;

FIG. 2 is a flow chart for explaining the operation by the method according to the first embodiment;

FIG. 3 is a block diagram of an apparatus for estimating a halftone image according to the first embodiment;

FIG. 5 is a table showing the relationship between binary image data stored in a ROM and its addresses according to the first embodiment;

FIG. 6 is a table showing the row addresses of a RAM according to the first embodiment;

FIG. 7 is a table showing a dither image within a unit area according to the first embodiment;

FIG. 8 is a flow chart for explaining gradation conversion processing of the halftone image estimated by the method according to the first embodiment;

FIG. 9 is a graph showing gradation conversion according to the first embodiment;

FIGS. 10(a) to 10(d) are tables for explaining binary processing by gradation conversion according to the first embodiment;

FIG. 11 is a flow chart for explaining filtering of the halftone image estimated by the method according to the first embodiment;

FIGS. 12(a) and 12(b) are tables showing the filter characteristics used in the filtering process of FIG. 11;

FIGS. 13(a) to 13(f) are tables for explaining binary processing by filtering according to the first embodiment;

FIG. 14 is a flow chart for explaining enlargement and reduction processing of the halftone image estimated by the method according to the first embodiment;

FIGS. 15(a) to 15(f) are tables for explaining binary processing by the enlargement and reduction processing of FIG. 14;

FIGS. 16A to 16D show different unit areas used in a method of estimating a halftone image according to a second embodiment of the present invention;

FIGS. 17(a) to 17(d) are tables showing estimation results of the halftone images obtained by using the unit areas in FIGS. 16A to 16D;

FIGS. 18 to FIG. 21(d) are tables for explaining the method according to the second embodiment;

FIG. 24 is a graph showing gradation conversion characteristics obtained in FIG. 23;

FIGS. 25(a) to 25(d) are tables for explaining binary processing by gradation conversion according to the second embodiment;

FIGS. 29(a) to 29(f) are tables for explaining binary processing by the enlargement and reduction processing according to the second embodiment;

FIGS. 30 and 31 are tables for explaining a method of estimating a halftone image according to a third embodiment of the present invention;

FIG. 32 is a table showing a halftone image estimated by the method according to the third embodiment;

FIGS. 33(a) to 33(d) are tables for explaining binary processing by gradation conversion according to the third embodiment;

FIGS. 34(a) to 34(f) are tables for explaining binary processing by filtering according to the third embodiment;

FIGS. 35(a) to 35(f) are tables for explaining binary processing by enlargement and reduction processing according to the third embodiment;

FIG. 36 is a table for explaining a method of estimating a halftone image according to a fourth embodiment of the present invention;

FIG. 37 is a table showing a halftone image estimated by the method according to the fourth embodiment;

FIGS. 38(a) to 38(d) are tables for explaining binary processing by gradation conversion according to the fourth embodiment;

FIGS. 39(a) to 39(f) are tables for explaining binary processing by filtering according to the fourth embodiment;

FIGS. 40(a) to 40(f) are tables for explaining binary processing by the enlargement and reduction processing according to the fourth embodiment; and FIGS. 41(a) and 41(b) are representations for explaining conventional image digital conversion schemes, respectively.

DETAILED DESCRIPTION OF THE PREFERRED EMBODIMENTS

Figure 4:
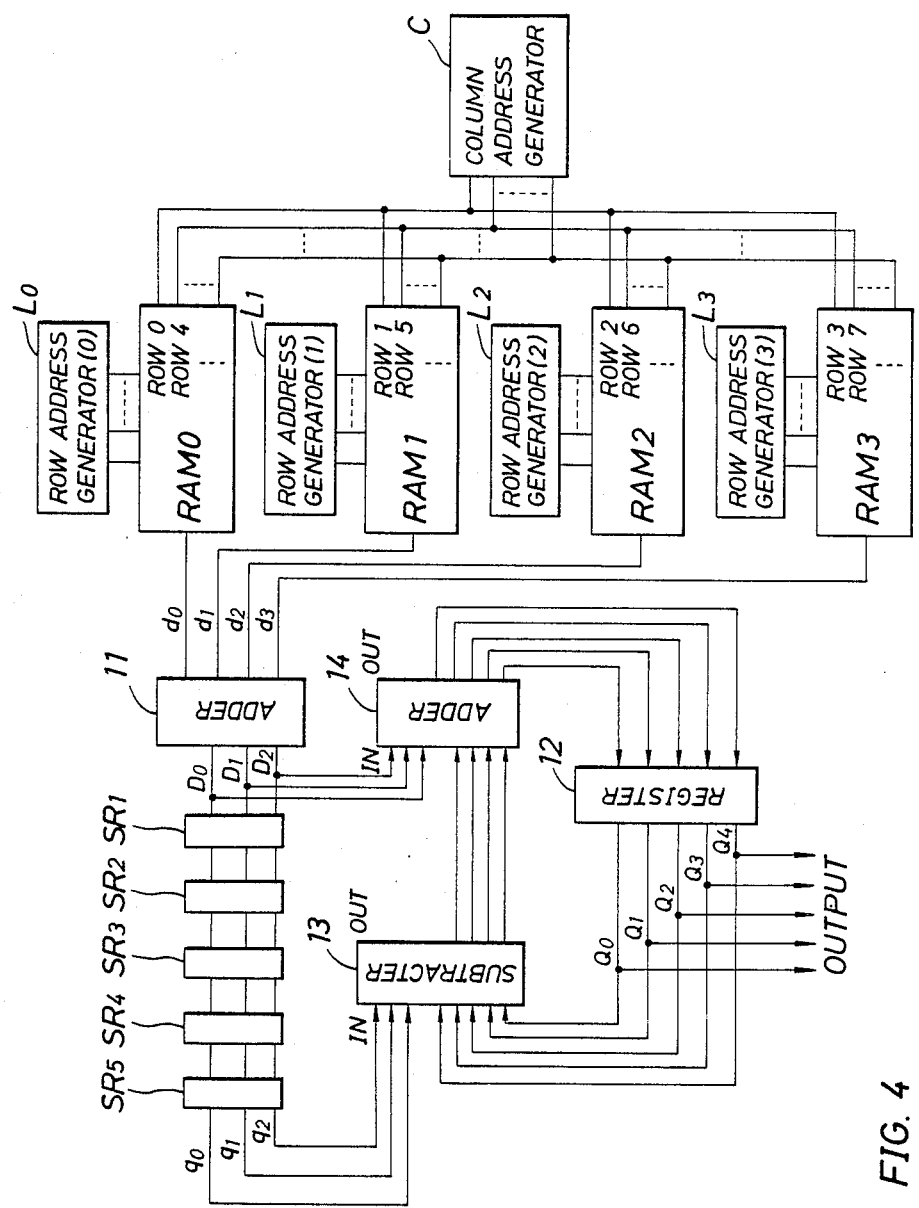
FIG. 4 is a block diagram of another apparatus for estimating a halftone image according to the first embodiment.

Preferred embodiments of the present invention will be described in detail with reference to the accompanying drawings. A 4×4 Bayer matrix is exemplified as a threshold matrix according to a systematic dither method.

FIGS. 1(a) to 1(f) show matrices for explaining a first embodiment of the present invention. More specifically, FIG. 1(a) shows an original halftone image converted to digital data, FIG. 1(b) shows a Bayer dither threshold matrix, and FIG. 1(c) shows a dither image (i.e., a binary image) of the original image (FIG. 1(a)) converted to a black-and-white binary image (i.e., a dither image) by the threshold matrix (FIG. 1(b)) (the black value is represented by a hatched portion for the sake of clarity). The Bayer threshold matrix has a dither pattern having dispersed dots, as shown in FIG. 1(b).

FIG. 1(d) shows a unit area set in the dither image of FIG. 1(c) to scan the dither image (FIG. 1(c)) in the row and column directions. In this embodiment, the unit area (FIG. 1(d)) has a 4×4 matrix, which is the same as the threshold matrix in FIG. 1(b). However, the unit area need not be a 4×4 matrix but can be a 2×2 matrix.

The unit area defined as shown in FIG. 1(d) is placed in the initial position (the first column of the first row) of the dither image, preferably such that the pixels are completely included in the unit area. In other words, preferably, a given pixel does not partially lie outside the unit area. The number of white pixels included in the unit area is counted and the count is given as an estimated value of the halftone image. In the state of FIG. 1(e), seven white pixels are included in the unit area and the estimated value of point (1, 1), i.e., the first row and the first column, is 7. The unit area is shifted by one pixel (one column in this case). The number of white pixels included in the unit area is counted as 7. This operation is repeated for all column pixels of the first row. When scanning of the first row is completed, the unit area (FIG. 1(d)) is shifted to the second row. Halftone estimation is started with point (2, 1), i.e., the second row and the first column. When the unit area is shifted to the last row to obtain all halftone estimated values, halftone estimation is completed.

FIG. 1(f) shows the estimated values of the respective pixels in the halftone image. Since the halftone image is estimated from a dither image (FIG. 1(c)) having less data than the original halftone image, the estimated halftone image cannot completely reproduce the original halftone image. However, except for portions where the density level of the original halftone image changes abruptly, the estimated halftone image is very similar to the original halftone image. In particular, when density does not change within the unit area, the estimated halftone image values completely coincide with the original halftone image values.

The above method is described with reference to a flow chart in FIG. 2. The unit area is initially set at point (1, 1) and the number of white pixels is counted. The count is given as a halftone density estimated value for the pixel at point (1, 1). The unit area is shifted by one column and the number of white pixels within the shifted unit area is counted to obtain a halftone density estimated value for point (1, 2). When halftone value estimation for the last column of the first row is completed, estimation is started from the pixel of point (2, 1). When the above operation is completed through the last column of the second row, estimation advances to the next row. When the halftone image estimated value for the pixel of the last row and the last column is obtained, the program sequence is ended.

FIG. 3 shows an apparatus for estimating a halftone image with the method according to the first embodiment. Referring to FIG. 3, reference numeral 1 denotes a black-and-white binary image. The dither image in FIG. 1(c) is used as such a binary image. The binary image may be displayed on a display device such as a CRT or recorded on a recording sheet. Reference numeral 2 denotes a focusing lens. A lens drive mechanism 3 drives the focusing lens 2 in the row and column directions. The lens drive mechanism 3 may be constituted by a closed loop mechanism with a DC servo motor, an open loop mechanism with a stepping motor, or the like.

A photoelectric transducer 4 converts to an electrical signal optical information from the binary image 1 focused by the focusing lens 2. The photoelectric transducer 4 comprises 4×4 photoelectric transducer elements (units) corresponding to the size of the 4×4 unit area. The photoelectric transducer 4 together with the focusing lens 2 scans the binary image 1. The photoelectric transducer 4 can be constituted by photo cells, photodiodes, phototransistors, CdSs, or the like. In this embodiment, the photoelectric transducer 4 comprises 4×4 photoelectric transducer elements. However, the transducer 4 may comprise a single photoelectric transducer element having a size corresponding to the 4×4 matrix.

A scanner 5 switches the outputs from the units in the photoelectric transducer 4. An amplifier 6 amplifies the output signals from the units in the transducer 4. An A/D converter 7 converts the output from the amplifier 6 to digital data. A CPU 8 receives the output from the A/D converter 7, counts the number of white pixels within the unit area, and calculates a halftone image estimated value. The A/D converter 7 only needs sufficient resolution (i.e., a few bits) to discriminate white values from black values. The CPU 8 comprises, for example, a microcomputer.

The operation of the apparatus having the arrangement described above will be described below. The unit area formed by the focusing lens 2, the lens drive mechanism 3 and the photoelectric transducer 4 is given such that the extended sides of the area scan the binary image 1, which is substantially uniformly irradiated with light. The initial position of the unit area is the point at the first row and column of the binary image 1. In this state, the optical information within the unit area (e.g., the region defined by the 4×4 matrix) of the binary image 1 is mapped on the photoelectric transducer 4 through the focusing lens 2 without modifications.

The scanner 5 switches the outputs from the units in the photoelectric transducer 4 and supplies each output to the amplifier 6. The amplifier 6 amplifies the input signal to a predetermined level. An output from the amplifier 6 is supplied as an input signal to the A/D converter 7. The A/D converter 7 converts the photoelectric transducer signals of the units sequentially switched by the scanner 5 to digital data. The CPU 8 receives the output from the A/D converter 7, counts the number of white pixels within the unit area, and outputs the count as the halftone density estimated value of point (1, 1), i.e., the first row and the first column of the binary image 1.

When the above operation is completed, the unit area is shifted to point (1, 2), i.e., the first row and the second column. A halftone density estimated value within the shifted unit area corresponding to coordinates (1, 2) is calculated in the same manner as for coordinates (1, 1). The unit area is thus shifted from column to column in the first row to obtain the halftone density estimated values for the first row. When scanning of the first row is completed, the unit area is shifted to point (2, 1), i.e., the second row and the first column, to calculate a halftone density estimated value within the unit area corresponding to coordinates (2, 1). Subsequently, scanning continues through the last column of the second row, thus obtaining all halftone density estimated values for the second row. Similarly, all halftone density estimated values up to the last row are calculated, and the halftone density estimation sequence is completed. The halftone density estimated values corresponding to the pixels and output from the CPU 8 are given as shown in FIG. 1(f). Using the estimated halftone image data, various types of image processing can be performed.

FIG. 4 shows another apparatus for estimating a halftone image from a digital image by using the method according to the first embodiment. In this case, the binary image is a digital binary image. The halftone image of the digitized binary image is estimated. Referring to FIG. 4, random access memories (to be referred to as RAMs hereinafter), i.e., RAM0 to RAM3 store binary image data in a divided manner. These RAMs are semiconductor ICs such as MOS ICs. The relationship between the binary image data stored in these RAMs and the addresses is shown in FIG. 5. The binary image data may be obtained by reading an image with a scanner or the like and converting the image to binary data using a dither method. Alternatively, the binary image data may be prepared by a computer. It should be noted that the unit area, in this case, comprises a 4×4 matrix.

Assume that the RAM areas for storing digital binary image data are represented by a matrix of rows and columns, as shown in FIG. 5. The first RAM0 stores data of every fourth rows, i.e., row 0, row 4, . . . , the second RAM1 stores data of different every fourth rows, i.e., row 1, row 5, . . . , the third RAM2 stores data of different every fourth rows, i.e., row 2, row 6, . . . , and the fourth RAM3 stores data of last every fourth rows, i.e., row 3, row 7.

Reference symbols $L_0$ to $L_3$ denote row address generators for supplying row address signals to the RAMs; and C, a column address generator for supplying the common column address signal to the RAMs. The RAMs (RAM0 to RAM3) generate outputs $d_0$ to $d_3$. A first adder 11 receives and adds the outputs $d_0$ to $d_3$ from the RAMs and outputs three-bit ($D_0$ to $D_2$) data. A 3-bit shift register $SR_1$ receives the outputs $D_0$ to $D_3$ from the adder 11. 3-bit shift registers $SR_2$ to $SR_5$ receive the preceding shift register outputs.

A 5-bit shift register 12 outputs a total number (count) of white pixels within the unit area having a predetermined size (4×4 in this embodiment). Outputs from the shift register 12 are $Q_0$ to $Q_4$. A subtracter 13 receives outputs $q_0$ to $q_2$ from the fifth shift register $SR_5$ and the output from the register 12 and subtacts the output from the shift register $SR_5$ from the 5-bit output from the register 12. A second adder 14 adds the 3-bit output from the first adder 11 and the 4-bit output from the subtracter 13. The 5-bit output from the second adder 14 is temporarily stored in the register 12.

The operation of the apparatus having the arrangement described above will be described below. The row address generators $L_0$ to $L_3$ in the respective RAMs are enabled in response to row clocks in FIG. 6 and the RAMs are accessed in response to the outputs from the row address generators $L_0$ to $L_3$. The relationship between the selected line address and the corresponding RAM number (NO.) is given in FIG. 5. For example, when row address 0 is accessed, data of row 0, data of row 1, data of row 2, and data of row 3 are respectively read out from the RAM0, RAM1, RAM2, and RAM3. When row address 1 is accessed, data of row 4, data of row 5, data of row 6, and data of row 7 are respectively read out from the RAM0, RAM1, RAM2, and RAM3.

The RAMs are simultaneously accessed in response to the column address signal from the common column address generator C. When the row and column address signals are supplied to the respective RAMs, binary data $d_0$ to $d_3$ stored at the accessed addresses is read out from the RAMs. The outputs from the RAMs are simply added by the first adder 11. A sum signal from the adder 11 appears as three bit signals $D_0$ to $D_2$. The number of output bits from the adder 11 is 3 since a decimal number "1+1+1+1=4" (maximum sum value), i.e., binary "100" of outputs $d_0$ to $d_3$ cannot be expressed by two bits. Three bits allow expression of numbers up to 7 (decimal).

The outputs $D_0$ to $D_2$ from the first adder 11 are supplied to the first shift register $SR_1$. In this case, the outputs preceding by four clock pulses and generated by the fifth shift register $SR_5$ are $q_0$ to $q_2$. The halftone image data $(Q_4Q_3Q_2Q_1Q_0)_0$ estimated by the previous calculation is stored in the register 12. Since a maximum value of the estimated value is $4 \times 4 (=16)$, it cannot be expressed by four bits. Thus, the number of output bits from the register 12 is selected to be 5.

The subtracter 13 receives the three bit signals $q_0$ to $q_2$ from the shift register $SR_5$ and the previous 5-bit data $(Q_4Q_3Q_2Q_1Q_0)_0$ from the register 12 and performs the following calculation:

$$(Q_4Q_3Q_2Q_1Q_0)_0 - (q_2q_1q_0) \tag{1}$$

A result given by calculation (1) is supplied as 4- or 5-bit data to the second adder 14. The second adder 14 receives the output $(D_2D_1D_0)$ from the first adder 11 and the output from the subtracter 13 and performs the following calculations:

$$(Q_4Q_3Q_2Q_1Q_0)_0 - (q_2q_1q_0) + (D_2D_1D_0) \tag{2}$$

A value obtained by calculation (2) becomes an updated halftone image estimated value $(Q_4Q_3Q_2Q_1Q_0)_N$. The new value can be given as follows:

$$(Q_4Q_3Q_2Q_1Q_0)_N = (Q_4Q_3Q_2Q_1Q_0)_0 - (q_2q_1q_0) + (D_2D_1D_0) \tag{3}$$

The above calculations are explained mathematically below. Assume that the dither image (binary data) within the unit area is given as data $d_{ij}$ for the ith row and jth column:

$$d_{ij} = 0 \text{ or } 1$$

for $$i = 1, \ldots, 4, \text{ and } j = 1, \ldots 4 \tag{4}$$

The estimated halftone image $\hat{Q}_N$ is expressed by:

$$\hat{Q}_N = \sum_{i=1}^{4} \sum_{i=1}^{4} d_{ij} \tag{5}$$

Assuming that:

$$P_j = \sum_{i=1}^{4} d_i \tag{6}$$

Equation (5) can be rewritten as:

$$\hat{Q}_N = \sum_{j=1}^{4} P_j \tag{7}$$

The immediately preceding estimated halftone image $\hat{Q}_0$ can be estimated from equation (7):

$$Q_0 = \sum_{j=0}^{3} P_j \tag{8}$$

Equations (7) and (8) with reference to FIG. 6 yield the following equation:

$$\hat{Q}_N = \hat{Q}_0 - P_0 + P_4 \tag{9}$$

for $$\hat{Q}_N = (Q_4Q_3Q_2Q_1Q_0)_N$$

$$\hat{Q}_0 = (Q_4Q_3Q_2Q_1Q_0)_0$$

$$P_0 = (q_2q_1q_0)$$

$$P_4 = (D_2D_1D_0)$$

Equation (9) coincides with equation (3), thus proving that the apparatus in FIG. 4 can calculate the estimated values of the halftone image.

In the above embodiment, the halftone image is estimated from the binary image. However, a new binary image can be obtained by gradation conversion, filtering, and enlargement and reduction conversion of the estimated halftone image.

FIG. 8 is a flow chart when gradation conversion (gradation processing) of the estimated halftone image is performed. The halftone image estimated by the method according to the first embodiment is gradation-converted and the converted halftone image is updated to produce a new binary image by using threshold matrices. The gradation conversion characteristics are exemplified, as shown in FIG. 9. Reference symbols $f_1$ and $f_2$ denote gradation conversion characteristic curves. The input is plotted along the abscissa and the output is plotted along the ordinate. Numerical values in the graph represent density levels.

FIG. 10(a) shows a halftone image obtained by gradation-converting the image (FIG. 1(f)) with the characteristic curve $f_1$ in FIG. 9. FIG. 10(b) shows a halftone image obtained by gradation-converting the image (FIG. 1(f)) with the characteristic curve $f_2$ in FIG. 9. FIG. 10(c) shows a binary image of the image in FIG. 10(a), and FIG. 10(d) shows a binary image of the image in FIG. 10(b). It is apparent that the resultant binary images greatly differ from each other according to the different gradation conversion characteristics.

FIG. 11 is a flow chart for filtering the estimated halftone image. The halftone image estimated by the method according to the first embodiment is filtered and the filtered halftone image is converted to a binary image by using threshold matrices. The filtering characteristics are shown in FIGS. 12(a) and 12(b), respectively. FIG. 12(a) shows the characteristics of a high-pass convolution filter and FIG. 12(b) shows the characteristics of a low-pass convolution filter.

When the estimated halftone image in FIG. 1(f) is filtered by the filtering characteristics in FIGS. 12(a) and 12(b), high- and low-pass halftone images in FIGS. 13(a) and 13(b) are obtained. When the high- and low-pass halftone images are digitized using dither matrices of FIGS. 13(c) and 13(d), binary images (dither images) shown in FIGS. 13(e) and 13(f) are obtained.

FIG. 14 is a flow chart for enlarging and reducing an estimated halftone image. The halftone image estimated by the method according to the first embodiment is enlarged or reduced, and the obtained halftone images are converted by binary images using threshold matrices. The enlargement and reduction schemes can be exemplified by extrapolation and interpolation.

FIG. 15(a) shows a 1.25-times halftone image obtained by enlarging the halftone image in FIG. 1(f) according to a nearest neighborhood method. FIG. 15(b) shows a 0.75-times halftone image obtained by reducing the halftone image in FIG. 1(f). The enlarged or reduced halftone images are digitized using dither matrices in FIGS. 15(c) and 15(d) to obtain binary images in FIGS. 15(e) and 15(f).

When a halftone image is estimated by a binary image, the binary image is preferably a dither or density pattern image. More preferably, the binary image is a dither image. In this case, the dither image is preferably a systematic dither image rather than a random dither image or a conditional dither image. The size of the unit area is preferably equal to a dither threshold matrix so as to assign each block of the matrix with each one of all threshold values.

The first embodiment exemplifies the case wherein the number of white pixels within the unit area is counted to estimate the halftone image. However, the present invention is not limited to this estimation mode or any other specific modes. It is essential to estimate the halftone image on the basis of a ratio of the white regions to the black regions within the unit area. In the above description, each pixel is scanned to obtain a halftone image. However, at least two pixels can be scanned to obtain a halftone image.

A method of estimating a halftone image according to a second embodiment of the present invention will be described with reference to FIGS. 16 to 22.

FIGS. 16A to 16D show different unit areas used in the second embodiment of the present invention. FIG. 16A shows a 2 (rows)×2 (columns) unit area A, FIG. 16B shows a 2 (rows)×4 (columns) unit area B, FIG. 16C shows a 4 (rows)×2 (columns) unit area C, and FIG. 16D shows a 4 (rows)×4 (columns) unit area D. A black dot at the enter of each unit area represents the center of shifting when the corresponding unit area is shifted on the dither image in FIG. 1(c). When the unit areas shown in FIGS. 16A to 16D are independently used and shifted on the dither image of FIG. 1(c) and the numbers of black or white pixels (white pixels in this case) within the unit areas are counted to calculate estimation values of the resultant halftone images, the corresponding halftone images shown in FIGS. 17(a) to 17(d) are obtained.

A method of calculating the estimated halftone image shown in FIG. 17(d) will be described below.

The unit area in FIG. 16D is located at the dither image initial position (i.e., the center of shifting is located at a point of the second row and column and the point is referred to as (2, 2) hereinafter), as shown in FIG. 18. In this case, preferably, the pixels are completely included in the unit area. In other words, part of a given pixel should not extend outside the unit area. The number of white pixels within the unit area is counted to give the count as the halftone estimated value. In this case, the count is 7. The estimated value of point (1, 1) of the halftone image is 7. The unit area is shifted by one pixel (one column in this case) and the number of white pixels within the shifted unit area is counted as 7. The same operation is performed for all columns of the first row. When scanning of the first row is completed, the unit area in FIG. 16D is shifted by one row and halftone density estimation for the next row is started. In this case, the center of the unit area is located at point (3, 2). When estimation is completed up to the last column of the last row, estimation is completed, thus obtaining the halftone image in FIG. 17(d).

A method of estimating the halftone image in FIG. 17(b) by using the unit area in FIG. 16B will be described below. In this case, the center of the unit area B must be the same as that of the largest unit area D. The unit area B is initially set, as shown in FIG. 19. In this state, the number of white pixels within the unit area B is 2. In order to set the unit area B equal to the unit area D, the number of white pixels must be doubled, i.e., 2×2=4. In this case, the unit area B has a gain of 2. The gains of other unit areas A and C are 4 and 2, respectively. The gain conversion calculation is performed whenever the unit area B is shifted by one pixel. The estimated halftone image in FIG. 17(b) can be obtained. The same operation is applicable to the cases in FIGS. 17(a) and 17(c), and a detailed description thereof will be omitted.

The halftone image can be effectively estimated by the method described above. The data in FIG. 17(a) to 17(d) represents the resultant halftone images. According to this method, the halftone image is estimated from the dither image in FIG. 17(c) having a smaller number of data than that of the original halftone image in FIG. 1(a). As shown in FIG. 17(d), the estimated halftone image cannot be completely converted to the original halftone image. However, except for a portion where the pixel level of the original halftone image abruptly changes, the estimated halftone image can be very similar to the original halftone image. In particular, when a density change does not occur within the unit area D, the estimated halftone image values completely coincide with the original halftone image values.

Man's sense of vision has a higher gradation discrimination capability in a low spatial frequency region (the region where pixel level changes are small) but a lower gradation discrimination capability in a high spatial frequency region (the region where pixel level changes are large). Based on this, a larger unit area is used in the low spatial frequency region to estimate a halftone image portion with a high gradation discrimination capability, thus obtaining an image of a high resolution. Better halftone image estimation can then be performed compared to that in FIGS. 17(a) to 17(d).

The method according to the second embodiment of the present invention will be described in more detail. This method is based on storage of a digital binary image in a storage means. Different unit areas are set for the digital binary images, and the digital binary image is operated according to predetermined processing. An optimal one of the different unit areas is selected for each pixel. The number of white pixels (or black pixels) within the selected unit area is counted to obtain an estimated value of the halftone image. The predetermined processing is performed using an algorithm for selecting a large unit area in the low spatial frequency region (the region where pixel level changes are small) and a small unit area in the high spatial frequency region (the region where pixel level changes are large).

The basic principle of this embodiment is to select largest possible unit areas unless density changes within the unit area are detected. Therefore, the unit areas A to D are selected in an order of D, C, B, and A. FIGS. 21(a) to 21(d) show steps of the method according to the second embodiment.

Step (1)

The unit area D is first selected. When the unit area D is located at the initial position (FIG. 1(c)), as shown in FIG. 18, the unit area D has a state shown in FIG. 21(a). The number of white pixels within the unit area D is counted to be 7. "7" is given as the average pixel level and "7"s are filled in pixel positions of the image in FIG. 21(b). When the average pixel level image in FIG. 21(b) is digitized by a threshold matrix shown in FIG. 21(c), the resultant binary image shown in FIG. 21(d) is obtained. Even if the dither image (FIG. 21(a)) is compared with the binary image (FIG. 21(d)), they do not coincide with each other. The noncoincidence means that the pixel level change occurs. In this case, the unit area D cannot be suitably used. Since the unit area D in step (1) is not selected, processing advances to step (2).

Step (2)

The unit area C is selected in step (2). The unit area C is placed in the initial position (FIG. 1(c)), as shown in FIG. 21(a). The number of white pixels within the unit area C is counted to be 4. The count "4" is multiplied with a gain of 2 to obtain 8, i.e., the average pixel level. "8"s are filled in the pixel positions of the image, as shown in FIG. 21B. The average pixel level image in FIG. 21(b) is digitized by a threshold matrix (i.e., a threshold matrix within the unit area) in FIG. 21(c) corresponding the second and third columns of the matrix in FIG. 1(b) to obtain a binary image in FIG. 21(d). The dither image in FIG. 21(a) is compared with the binary image in FIG. 21(d) and no coincidence can be established. The noncoincidence indicates that the pixel level change occurs. The unit area C is discriminated not to be suitable. Since the unit area C is not selected in step (2), processing advances to step (3).

Step (3)

The unit area B is selected in step (3). The unit area B is located in the initial position of FIG. 1(c), as shown in FIG. 21(a). The number of white pixels within the unit area is counted to be 2. The count "2" is multiplied with a gain of 2 to obtain 4 as the average pixel level. The average pixel level image is shown in FIG. 21(b). This image is digitized using a threshold matrix of FIG. 1(c) to produce a binary image in FIG. 21(d). The dither image in FIG. 21(a) is compared with the binary image in FIG. 21(d) and coincides therewith. The coincidence indicates that no pixel level change occurs within the unit area. The unit area B is discriminated to be suitable. However, if no coincidence is established in step (3), the smallest unit area A is selected.

Since the unit area B is selected in step (3), the number of white pixels within the unit area B is 2. The gain of the unit area B is 2 and the estimated value is thus obtained as 4 ($=2\times 2$). The pixel level in FIG. 21(b) in step (3) is given as the image estimated value. The above operation is performed for all pixels of the dither image in FIG. 1(c) and the estimated halftone image in FIG. 22 can be obtained. The actual use of the unit areas for the first row is as follows. The unit area B is used for (1, 1) of the estimated halftone image; B, for (1, 2); A for (1, 3); B for (1, 4); D for (1, 5); D for (1, 6); and D for (1, 7).

Figure 22:
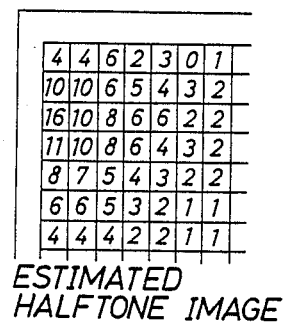
FIG. 22 is a table for explaining the halftone image estimated by the method according to the second embodiment.

For the estimated halftone image in FIG. 22, the large unit area is used in the region where pixel level changes are small, and the small unit area is used in the region where pixel level changes are large. This estimation scheme is compatible with man's sense of vision. Therefore, the estimated halftone image extremely resembles the original halftone image in FIG. 1(a).

In the above description, a halftone image is estimated from a dither image. However, gradation conversion, filtering, or enlargement/reduction conversion of the estimated halftone image can be performed to obtain a new binary image.

Figure 23:
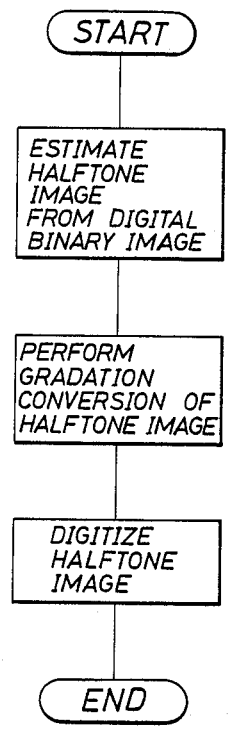
FIG. 23 is a flow chart for explaining gradation conversion of the halftone image estimated by the method according to the second embodiment.

FIG. 23 is a flow chart for performing gradation conversion (gradation processing) of the estimated halftone image. The halftone image estimated by the method according to the second embodiment is gradation-converted and the converted halftone image is digitized to a new binary image according to a threshold matrix. The gradation conversion characteristics are shown in FIG. 24. Reference symbols f1 and f2 denote gradation conversion characteristic curves. The input is plotted along the abscissa and the output is plotted along the ordinate. The numerical values in the graph represent pixel levels.

FIG. 25(a) shows a halftone image obtained by gradation-converting the image (FIG. 22) with the characteristic curve f1 in FIG. 24. FIG. 25(b) shows a halftone image obtained by gradation-converting the image (FIG. 22) with the characteristic curve f2 in FIG. 24. FIG. 25(c) is a binary image obtained by digitizing the image (FIG. 25(a)) using the 4×4 Bayer dither matrix. FIG. 25(d) is a binary image obtained by digitizing the image (FIG. 25(b)) using the same matrix. The binary images greatly differ from each other according to the different gradation conversion characteristics.

Figure 26:
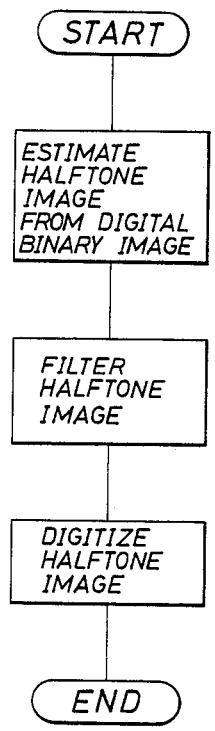
FIG. 26 is a flow chart for explaining filtering of the halftone image estimated by the method according to the second embodiment.

FIG. 26 is a flow chart for filtering the estimated halftone image. The halftone image estimated by the method according to the second embodiment is filtered and the filtered halftone image is digitized to a new binary image by using a threshold matrix. The filtering characteristics are shown in FIGS. 12(a) and 12(b). FIG. 12(a) shows the characteristics of the high-pass convolution filter and FIG. 12(b) shows the characteristics of the low-pass convolution filter.

Figures 27A, 27B, 27C, 27D, 27E, 27F, 28:
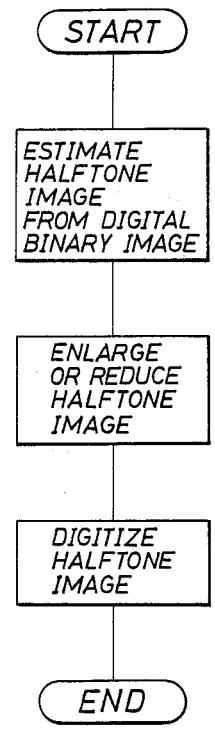
FIGS. 27(a) to 27(f) are tables for explaining binary processing by filtering according to the second embodiment.
FIG. 28 is a flow chart for explaining enlargement and reduction processing of the halftone image estimated by the method according to the second embodiment.

When the estimated halftone image in FIG. 22 is filtered by the filtering characteristics in FIGS. 12(a) and 12(b), high- and low-pass halftone images in FIGS. 27(a) and 27(b) are obtained. When the high- and low-pass halftone images are digitized using dither matrices of FIGS. 27(c) and 27(d), binary images (dither images) shown in FIGS. 27(e) and 27(f) are obtained.

FIG. 28 is a flow chart for enlarging or reducing an estimated halftone image. The halftone image estimated by the method according to the second embodiment is enlarged or reduced and the obtained halftone images are converted by binary images using threshold matrices. The enlargement and reduction schemes can be exemplified by extrapolation and interpolation.

FIG. 29(a) shows a 1.25-times halftone image obtained by enlarging the halftone image in FIG. 22 according to a nearest neighborhood method. FIG. 29(b) shows a 0.75-times halftone image obtained by reducing the halftone image in FIG. 22. The enlarged or reduced halftone images are digitized using dither matrices in FIGS. 29(c) and 29(d) to obtain binary images in FIGS. 29(e) and 29(f).

In this case, the dither image is preferably a systematic dither image rather than a random dither image or a conditional dither image so as to uniformly set threshold values in the pixel positions of the largest unit area. Alternatively, a distributed dither image for uniformly setting the threshold values in the pixel positions of the smallest unit area is preferred. A distributed Bayer dither image is particularly preferable.

The second embodiment exemplifies the case wherein the number of white pixels within the unit area is counted to estimate the halftone image. However, the present invention is not limited to this estimation mode or any other specific modes, and the number of black pixels can be counted.

In the above description, each pixel is scanned to obtain a halftone image. However, at least two pixels can be scanned to obtain a halftone image. Four different unit areas are used in the second embodiment. However, the number of unit areas is not limited to four but can be extended to any number. The sizes of the unit areas are not limited to the illustrated ones, but can vary.

A method of estimating a halftone image according to a third embodiment of the present invention will be described with reference to FIGS. 30 to 32.

The pixel of the first row and column of the dither image in FIG. 1(c) is exemplified to show how to use the unit areas in FIGS. 16A to 16D. Assume the following conditions for no pixel level changes:

$$|B_1 - B_2| \leq 1 \quad (10)$$

$$|C_1 - C_2| \leq 1 \quad (11)$$

The relationship between $B_1$, $B_2$, $C_1$, and $C_2$ is given in FIG. 30. $B_1$ and $B_2$ are the numbers of white pixels within the adjacent unit areas B in FIG. 16B and $C_1$ and $C_2$ are the numbers of white pixels within the adjacent unit areas C in FIG. 16C.

$B_1$, $B_2$, $C_1$, and $C_2$ are arranged in FIG. 30 to check if inequalities (10) and (11) are satisfied. If satisfactory, a circle is given; but if not, a cross is given. The unit areas are determined according to the conditions, as shown in FIG. 31. Referring to FIG. 31, when both inequalities (10) and (11) are satisfied, pixel level changes are small and a large unit area is used to provide a high gradation discrimination capability. Thus, the unit area D is selected. If inequality (1) is satisfied but inequality (2) is not satisfied, the unit area C is selected since the pixel level change in the vertical direction (the Y direction in FIG. 30) is small and the pixel level change in the horizontal direction (the X direction in FIG. 30) is large. If inequality (2) is satisfied but inequality (1) is not satisfied, the unit area B is selected since the pixel level change in the horizontal direction (the X direction in FIG. 30) is small and the pixel level change in the vertical direction (the Y direction in FIG. 30) is large. If neither inequalities (1) and (2) are satisfied, the smallest unit area A is selected to obtain a high resolution since the pixel level changes along the horizontal and vertical directions (the X and Y directions) are large.

According to the method of the third embodiment, the optimal unit area is selected for each pixel. The number of white pixels (or black pixels) within the selected unit area is counted. In a matrix (FIG. 30) corresponding to the upper left corner of FIG. 1(c), $B_1 = 2$, $B_2 = 5$, $C_1 = 3$, and $C_2 = 4$. In this case, inequality (2) is satisfied but inequality (1) is not satisfied. Therefore, an optimal unit area is B according to the table in FIG. 31. When the unit area B is set in the initial position in FIG. 19, the number of white pixels within the area B is 2. The gain of B is 2 and thus the halftone image estimated value of point (2, 2) of the dither image is 4 (=2×2). The unit area is selected for the location having the central point (2, 3) to calculate its estimated value. The optimal unit area is selected for each point to obtain all estimated values.

FIG. 32 shows a halftone image estimated in the manner as described above. The actual use of the unit areas for the first row of the estimated halftone image is as follows: the unit area B is selected for point (1, 1); B for (1, 2); B for (1, 3); A for (1, 4); C for (1, 5), D for (1, 6); and D for (1, 7).

In the estimated halftone image in FIG. 32, the halftone image portion with small pixel level changes is estimated using a large unit area, and the halftone image portion with large pixel level changes is estimated using a small unit area. Such estimation is compatible with man's sense of vision. Therefore, the estimated halftone image extremely resembles the original halftone image in FIG. 1(a).

In the above description, a halftone image is estimated from a binary image. However, gradation conversion, filtering, or enlargement/reduction conversion of the estimated halftone image can be performed to obtain a new binary image.

FIG. 23 is a flow chart for performing gradation conversion (gradation processing) of the estimated halftone image. The halftone image estimated by the method according to the third embodiment is gradation-converted and the converted halftone image is digitized to a new binary image according to a threshold matrix. The gradation conversion characteristics are shown in FIG. 24. Reference symbols f1 and f2 denote gradation conversion characteristic curves. The input is plotted along the abscissa and the output is plotted along the ordinate. The numerical values in the graph represent pixel levels.

FIG. 33(a) shows a halftone image obtained by gradation-converting the image (FIG. 32) with the characteristic curve f1 in FIG. 24. FIG. 33(b) shows a halftone image obtained by gradation-converting the image (FIG. 32) with the characteristic curve f2 in FIG. 24. FIG. 33(c) is a binary image obtained by digitizing the image (FIG. 33(a)) using the 4×4 Bayer dither matrix. FIG. 33(d) is a binary image obtained by digitizing the image (FIG. 33(b)) using the same matrix. The binary images greatly differ from each other according to the different gradation conversion characteristics.

FIG. 26 is a flow chart for filtering the estimated halftone image. The halftone image estimated by the method according to the third embodiment is filtered and the filtered halftone image is digitized to a new binary image by using a threshold matrix. The filtering characteristics are shown in FIGS. 12(a) and 12(b). FIG. 12(a) shows the characteristics of the high-pass convolution filter and FIG. 12(b) shows the characteristics of the low-pass convolution filter.

When the estimated halftone image in FIG. 32 is filtered by the filtering characteristics in FIGS. 12(a) and 12(b), high- and low-pass halftone images in FIGS. 34(a) and 34(b) are obtained. When the high- and low-pass halftone images are digitized using dither matrices of FIGS. 34(c) and 34(d), binary images (dither images) shown in FIGS. 34(e) and 34(f) are obtained.

FIG. 28 is a flow chart for enlarging or reducing an estimated halftone image. The halftone image estimated by the method according to the third embodiment is enlarged or reduced and the obtained halftone images are converted by binary images using threshold matrices. The enlargement and reduction schemes can be exemplified by extrapolation and interpolation.

FIG. 35(a) shows a 1.25-times halftone image obtained by enlarging the halftone image in FIG. 32 according to a nearest neighborhood method. FIG. 35(b) shows a 0.75-times halftone image obtained by reducing the halftone image in FIG. 32. The enlarged or reduced halftone images are digitized using dither matrices in FIGS. 35(c) and 35(d) to obtain binary images in FIGS. 35(e) and 35(f).

A method of estimating a halftone image according to a fourth embodiment of the present invention will be described below. The method of the fourth embodiment is similar to that of the third embodiment. An algorithm of the fourth embodiment selects a large unit area in a low spatial frequency region (the region where pixel level changes are small) and a small unit area in a high spatial frequency region (the region where pixel level changes are large).

The unit areas A to D in FIGS. 16A to 16D are used in the same manner as in the third embodiment. The numbers of white pixels within the unit areas are represented by a to d. Conditions for no pixel level changes are given as follows:

$$|2a-b| \leq 1 \quad (12)$$

$$|2a-c| \leq 1 \quad (13)$$

$$|2b-d| \leq 1 \quad (14)$$

$$|2c-d| \leq 1 \quad (15)$$

If these inequalities are satisfied, circles are given. Otherwise, crosses are given. According to the combination of the circle and the cross, an optimal unit area is selected, as shown in FIG. 36. An asterisk * represents a circle or cross. If neither inequalities (12) and (13) are satisfied, the unit area A is selected without checking inequalities (14) and (15). If inequality (12) is satisifed but inequality (13) is not, the unit area B is selected. If inequality (12) is not satisfied but inequality (13) is satisfied, the unit area C is selected. If all inequalities (12) to (15) are satisfied, the unit area D is selected.

An optimal unit area is determined as follows when the centers of the unit areas are located at point (2, 2) of the dither image in FIG. 1(c). Since a=1, b=2, c=4, and d=7, we have $$|2a-b|=|2-2|=0$$

$$|2a-c|=|2-4|=2$$

Inequalities (12) and (13) are thus satisified and the optimal unit area is given as B according to the table in FIG. 36. An estimated value of the pixel of the first row and first column of the halftone image upon selection of the unit area B is estimated. The number b of white pixels in the initial position of the unit area B is given as 2 and the gain of the area B is 2, thus obtaining the estimated value as 4 (=2×2).

FIG. 37 shows a halftone image estimated in the manner as described above. The actual use of the unit areas for the first row of the estimated halftone image is as follows: the unit area B is selected for point (1, 1); B for (1, 2); B for (1, 3); A for (1, 4); C for (1, 5); D for (1, 6); and D for (1, 7).

In the estimated halftone image in FIG. 37, the halftone image portion with small pixel level changes is estimated using a large unit area and the halftone image portion with large pixel level changes is estimated using a small unit area. Such estimation is compatible with man's sense of vision. Therefore, the estimated halftone image extremely resembles the original halftone image in FIG. 1(a).

In the above description, a halftone image is estimated from a binary image. However, gradation conversion, filtering, or enlargement/reduction conversion of the estimated halftone image can be performed to obtain a new binary image. The gradation conversion (gradation processing) of the estimated halftone image is performed according to the same flow chart in FIG. 23. The gradation conversion characteristics are shown in FIG. 9 in the same manner as in the third embodiment.

FIG. 38(a) shows a halftone image obtained by gradation-converting the image (FIG. 37) with the characteristic curve f1 in FIG. 9. FIG. 38(b) shows a halftone image obtained by gradation-converting the image (FIG. 37) with the characteristic curve f2 in FIG. 9. FIG. 38(c) is a binary image obtained by digitizing the image (FIG. 38(a)) using the dither matrix. FIG. 38(d) is a binary image obtained by digitizing the image (FIG. 38(b)) using the same matrix. The binary images greatly differ from each other according to the different gradation conversion characteristics.

The estimated halftone image in FIG. 37 is filtered in the same flow as in FIG. 26. The halftone image estimated by the method according to the fourth embodiment is filtered and the filtered halftone image is digitized to a new binary image by using a threshold matrix. The filtering characteristics are shown in FIGS. 12(a) and 12(b). FIG. 12(a) shows the characteristics of the high-pass convolution filter and FIG. 12(b) shows the characteristics of the low-pass convolution filter. When the estimated halftone image in FIG. 32 is filtered by the filtering characteristics in FIGS. 12(a) and 12(b), high- and low-pass halftone images in FIGS. 39(a) and 39(b) are obtained. When the high- and low-pass halftone images are digitized using dither matrices of FIGS. 39(c) and 39(d), binary images (dither images) shown in FIGS. 39(e) and 39(f) are obtained.

The estimated halftone image in FIG. 37 can be enlarged or reduced and the obtained halftone images are converted by binary images using threshold matrices. The flow chart of this processing is the same as in FIG. 28. The enlargement and reduction schemes can be exemplified by extrapolation and interpolation. FIG. 40(a) shows a 1.25-times halftone image obtained by enlarging the halftone image in FIG. 37 according to a nearest neighborhood method. FIG. 40(b) shows a 0.75-times halftone image obtained by reducing the halftone image in FIG. 37. The enlaraged or reduced halftone images are digitized using dither matrices in FIGS. 40(c) and 40(d) to obtain binary images in FIGS. 40(e) and 40(f).

In the third and fourth embodiments, when a halftone image is estimated by a binary image, the binary image is preferably a dither or density pattern image. More preferably, the binary image is a dither image. In this case, the dither image is preferably a systematic dither image rather than a random dither image or a conditional dither image. In this case, the dither image is preferably a systematic dither image rather than a random dither image or a conditional dither image so as to uniformly set threshold values in the pixel positions of the largest unit area. Alternatively, a distributed dither image for uniformly setting the threshold values in the pixel positions of the smallest unit area is preferred. A distributed Bayer dither image is particularly preferable.

Among the different unit areas, the largest unit area is preferably equal to the threshold matrix of the systematic dither image. More specifically, digital binary images are stored in a storage means such as a memory. The different unit regions are set for these digital binary images. The digital binary image is operated according to predetermined processing. An optimal unit area is selected for each pixel. The number of white pixels (or black pixels) within the selected unit area is counted to obtain an estimated value of the halftone image. The predetermined processing is performed by an algorithm of the third or fourth embodiment.

The third and fourth embodiments exemplify the case wherein the number of white pixels within the unit area is counted to estimate the halftone image. However, the present invention is not limited to this estimation mode or any other specific modes. It is essential to estimate the halftone image on the basis of a ratio of the white regions to the black regions within the unit area. In the above description, each pixel is scanned to obtain a halftone image. However, at least two pixels can be scanned to obtain a halftone image. Four different unit areas are used in the third and fourth embodiments. However, the number of unit areas is not limited to four but can be extended to any number. The sizes of the unit areas are not limited to the illustrated ones, but can vary.

What is claimed is:

1. A method of estimating a halftone image comprising setting a unit area in a binary image consisting of black and white regions, shifting the unit area, and estimating the halftone image on the basis of a ratio of the white regions to the black regions within the unit area, wherein the binary image is a digital binary image, a number of white or black pixels within each unit area is counted while the unit area is shifted, and the halftone image is estimated on the basis of a count for each unit area.

2. A method according to claim 1, wherein different unit areas are set for a binary image consisting of black and white regions, one of said different unit areas which satisfies predetermined conditions is selected and shifted in units of pixels, and the halftone image is estimated on the basis of a ratio of the white regions to the black regions within each selected unit area.

3. A method according to claim 2, wherein the binary image comprises a digital binary image, different unit areas are set, the numbers of black or white pixels within the unit areas are calculated and operated according to predetermined processing to select a corresponding one of the different unit areas for each pixel of the halftone image to be estimated, and the halftone image is estimated on the basis of the number of black or white pixels within each selected unit area.

4. A method according to claim 2, wherein the binary image comprises a dither image prepared by a dither matrix, different unit areas are set, the dither image within the unit area for each pixel is compared with a binary image within the unit area, the binary image being obtained by the dither matrix on the basis of a halftone image prepared by the number of white or black pixels within the unit area to select one of the different unit areas for each pixel of a halftone image to be estimated, and the halftone image is estimated on the basis of the number of black or white pixels within each selected unit area.

5. A method according to claim 1, wherein the binary image is the dither image.

6. A method according to claim 5, wherein the dither image is a systematic dither image.

7. A method according to claim 6, wherein the systematic dither image is a dot-distributed dither image.

8. A method according to claim 7, wherein the dot-distributed dither image is a Bayer dither image.

9. A method according claim 6, wherein a largest one of the different unit areas is equal to a size of a threshold matrix of the systematic dither image.

* * * * *